Patented Dec. 31, 1946

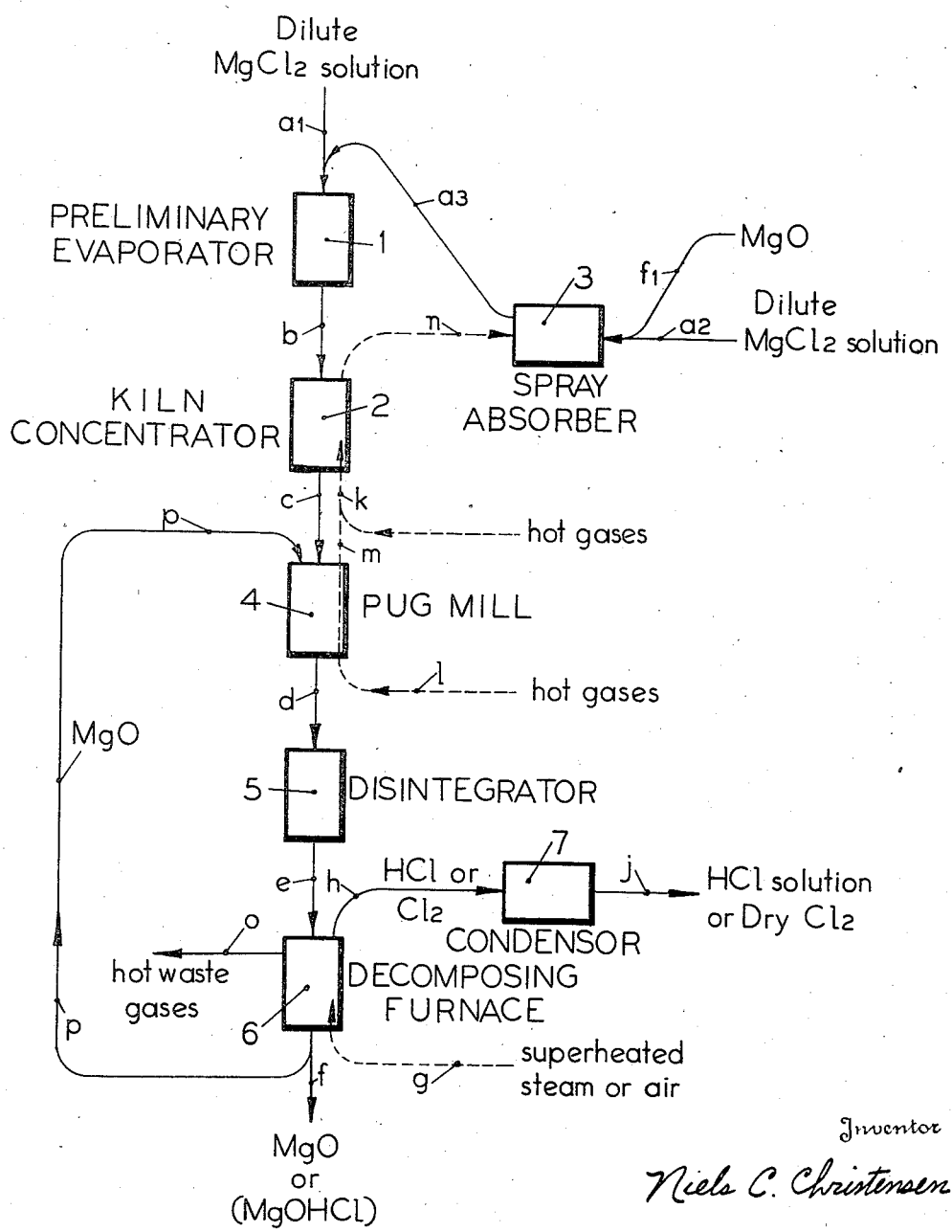
Fig. I

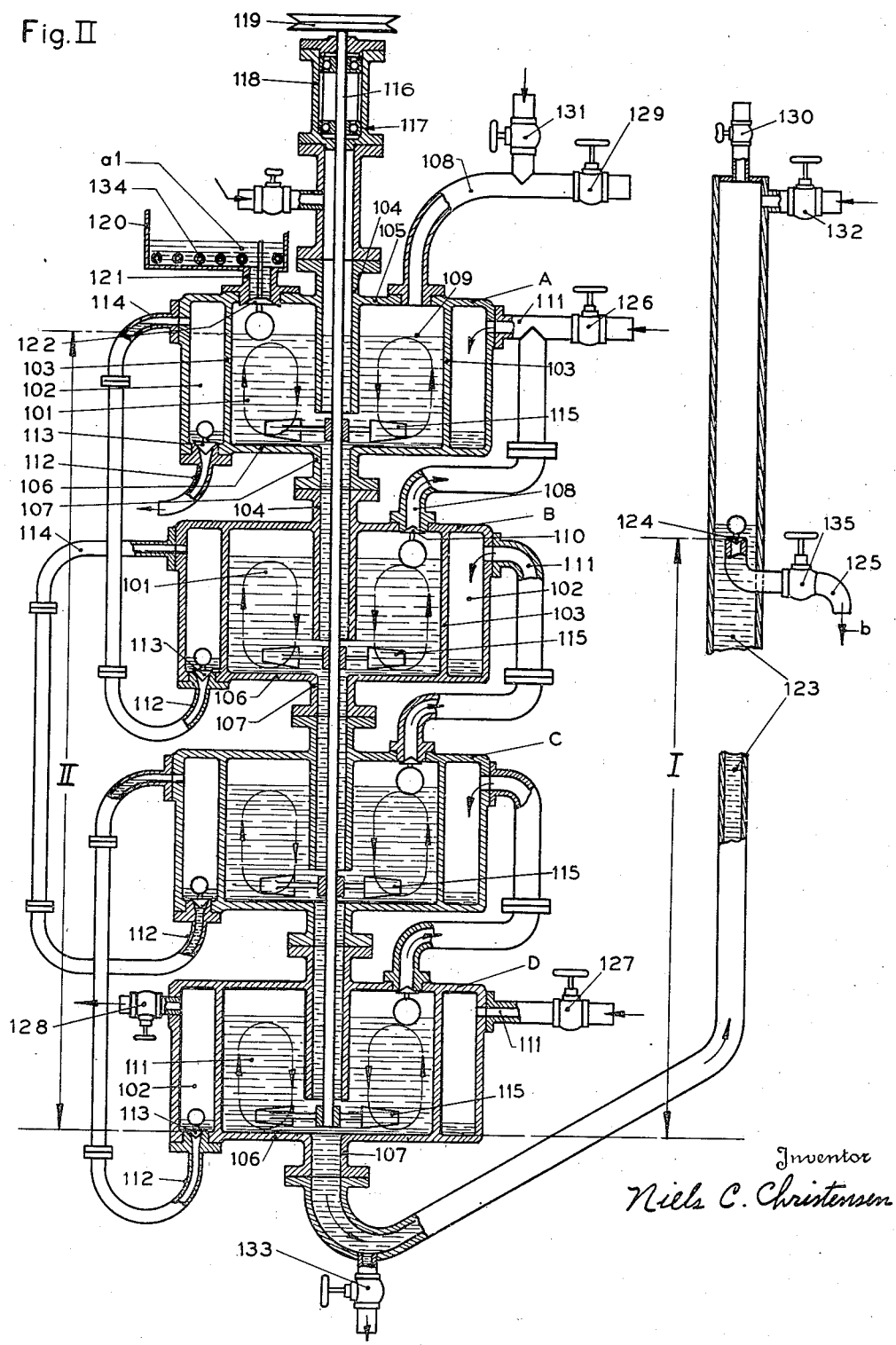

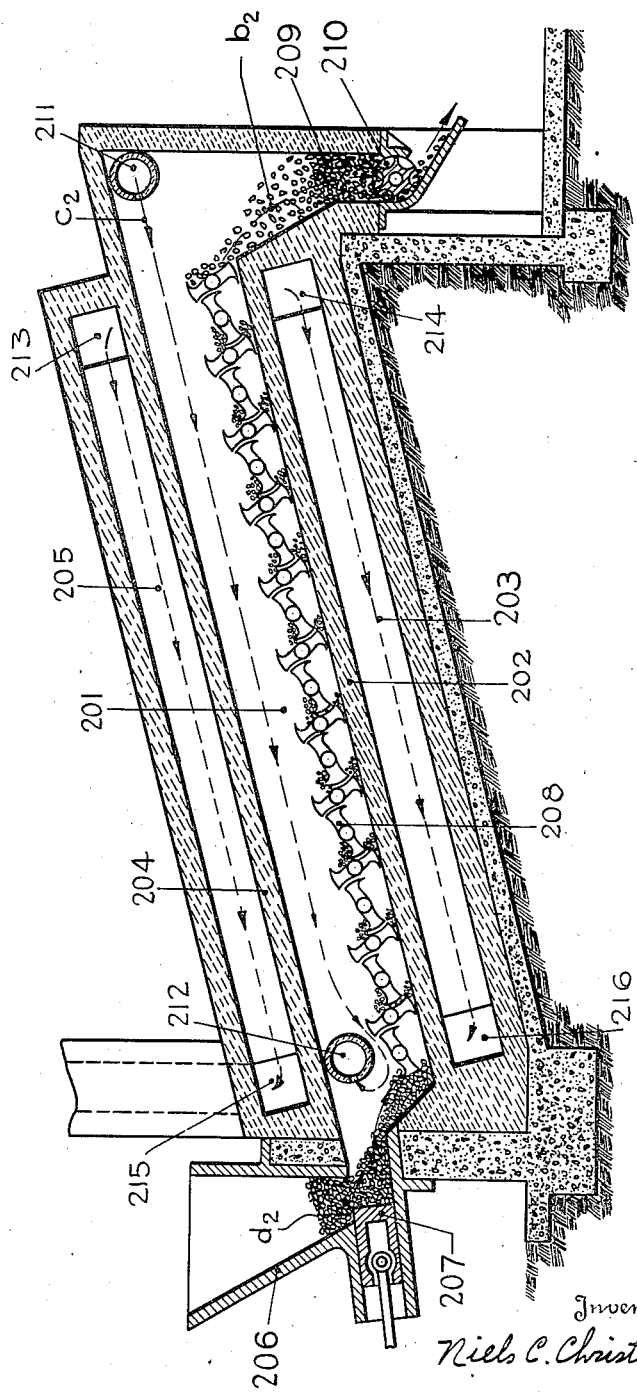
Fig. III

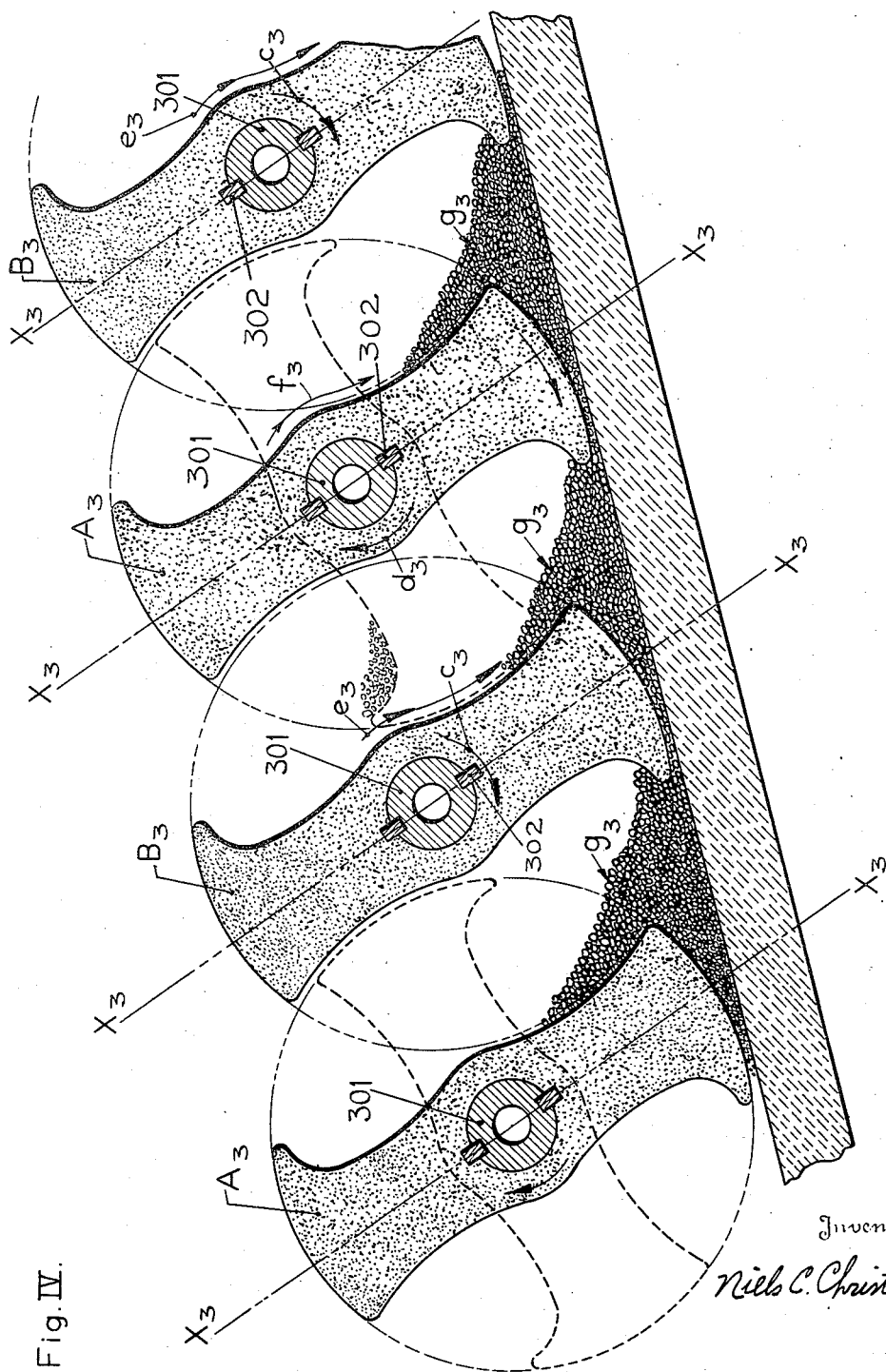

2,413,292

UNITED STATES PATENT OFFICE 2,413,292

RECOVERY AND DECOMPOSITION OF MgCl₂

Niels C. Christensen, Salt Lake City, Utah, assignor to Combined Metals Reduction Company, Salt Lake City, Utah, a corporation of Utah Application January 17, 1944, Serial No. 518,618

10 Claims. (Cl. 23—201)

This invention relates to recovery of MgCl₂ from solution and the decomposition of the MgCl₂ to secure MgO or Mg(OH)Cl and HCl or MgO and chlorine. As is well known to chemists and metallurgists, MgCl₂ when heated in the presence of steam decomposes to form MgOHCl and HCl, or MgO and HCl, and when heated in the presence of oxygen decomposes to form MgO and Cl₂ as indicated in the following chemical equations:

1. $MgCl_2 + H_2O = Mg(OH)Cl + HCl$
2. $MgCl_2 + H_2O = MgO + 2HCl$
3. $2MgCl_2 + O_2 = 2MgO + 2Cl_2$

The first reaction begins at approximately 200° C., the reaction being very slow at this temperature but, becomes more rapid with increase in temperature until at 450° C. to 500° C. the reaction is very rapid and, under proper conditions, may be made substantially complete in a short period of treatment. The second reaction begins at approximately 500° C. and is very rapid at 650° C. or higher temperatures and, under proper conditions, may be made substantially complete in a relatively short time. The third reaction begins at a temperature below 100° C. but is extremely slow at low temperatures, the reaction becoming more rapid with increase in temperature until at 650° C. the decomposition is very rapid, and may be made complete in a relatively short period under proper conditions of treatment. Studies on the equilibrium conditions in these reactions show that relatively concentrate HCl and Cl₂ gases may be secured at temperatures above 600° C., and that relatively small amounts of heat are required for the decomposition, the first reaction being slightly exothermic (+5100 cal.), the second being quite endothermic (−20700 cal.) and the third slightly endothermic (−5600 at 600° C.). In spite of the apparent ease of decomposition of MgCl₂, numerous commercial attempts to utilize the above reactions to secure MgO and HCl or chlorine have failed on account of the lack of understanding of the conditions necessary for the successful economic carrying out of such a process. The main difficulties encountered in the process have been due, first, to the difficulty of securing a dry or substantially solid MgCl₂ by the methods commonly used and, second, to the failure to use methods and apparatus in the decomposition which would make possible the use of a minimum of steam or air (oxygen), so as to avoid excess waste of heat and to secure a concentrated HCl or Cl₂ gas. The first difficulty, that of securing a solid MgCl₂ product, led to attempts to secure decomposition directly from the MgCl₂ solution, such attempts being doomed to failure on account of the excessive heat requirements, the limited period of treatment possible, the very dilute HCl gases secured and the poor decomposition obtained. Attempts to decompose the solid product also failed due to failure to understand the requirements necessary for complete and rapid decomposition and for the securing of a relatively concentrated HCl gas.

The difficulties encountered in securing a solid product from solutions containing the MgCl₂ have been due to the partial decomposition of the MgCl₂ in hot concentrated solutions and the sticking of the solid product to the drying or heating surfaces as a cement-like mass. The difficulties encountered in the attempts to decompose the solid product with steam, have been due to the use of apparatus in which no effective contact of steam and MgCl₂ were secured, and in which also no segregation of the steam and the HCl was maintained, so that a minimum of steam might be used and a concentrated HCl gas might be secured. The difficulties encountered in securing a solid MgCl₂ are overcome in my process by the method of evaporation used to secure the final concentrated MgCl₂ solution, and the recovery of the MgCl₂ in a solid mixed MgCl₂ - MgO product (and not as a relatively pure MgCl₂ product), and the difficulties encountered in the decomposition process are overcome, by the countercurrent treatment of the dry MgCl₂ - MgO product with steam (or air) in such a manner, that an effective segregation of the steam (or air or oxygen) is maintained, so as to make possible the use of a minimum of steam (or air or oxygen) and thus secure a complete decomposition and a concentrated HCl (or Cl₂) gas.

The method of carrying out the process is illustrated in the accompanying flow sheet, Fig. I, and set forth in detail in the following description. The diagrammatic illustrations of the preferred type of multiple effect evaporator, and the decomposing furnace preferred for use in the process, are shown in Figs. II, III and IV, Fig. II showing a vertical section of the evaporator, Fig. III a longitudinal vertical section of the decomposing furnace and Fig. IV showing in enlarged cross-section a detail of the furnace.

The process consists in general of three steps: (1) the concentration of the MgCl₂ solution, (2) the formation of the solid MgCl₂ - MgO product and (3) the decomposition of the MgCl₂ in the MgCl₂ - MgO product.

1. Concentration of the MgCl₂ solution

The concentration of the MgCl$_2$ solution is preferably carried out in two stages, particularly, if the original solution is somewhat dilute. In the first stage the solution is preferably evaporated in a multiple effect evaporator or, if fuel is cheap or hot waste gases are available, in a spray type evaporator, indicated as preliminary evaporator 1 on the flow sheet, Fig. I. The multiple effect evaporator may be of the type shown diagrammatically in Fig. II, or of any other suitable type. The spray evaporator may be of the type shown in my U. S. Patent 1,462,363 (or of any other suitable type). The relatively dilute solution $a_1$ is first evaporated to form a relatively concentrated solution in the preliminary evaporator 1. If this evaporation is carried out in the preferred type of apparatus of Fig. II, the operation is conducted as described below. The multiple effect evaporator of Fig. II consists of a vertical series of jacketed evaporating chambers or effects A, B, C, D. Each of these chambers consists of a central cylindrical solution chamber 101 surrounded by an annular steam chamber 102, the two chambers being separated by the heat transfer wall 103. Each chamber or effect is supplied with a vertical central pipe 104 which passes through the top 105 of each effect and extends nearly to the bottom 106 of the chamber. Evaporated solution from each chamber is passed from the chamber through the outlet pipes 107 which connect with the center of the bottom 106 of each chamber. Steam from each evaporating chamber 101 escapes through the outlet pipes 108. The solution level 109 in each solution chamber 101 is regulated by the float valves 110 which prevent escape of steam through the outlet pipes 108 until the solution level 109 is low enough that the valve falls away from its seat at the lower end of the pipe 108. Steam is admitted to each steam chamber or jacket 102 through the inlet pipes 111 which connect with the upper part of the chamber 102. Condensate from each jacket or steam chamber 102 escapes through the outlet pipes 112, the escape being controlled by the float valves 113 which are seated upon the upper end of the pipes 112 so that the pipe is opened only when the condensate level is such as to lift the float valve from its seat. Condensate is admitted to each jacket 102 through the condensate inlet pipes 114. The separate effects are connected in a complete vertical column by joining the solution outlet pipes 107 from each upper effect to the inlet pipe 104 of the effect below, the steam inlet pipes 111 of each upper effect to the steam outlet pipes 108 of the effect below, and the condensate outlet pipes 112 of each lower effect to the condensate inlet pipes 114 of each upper effect. In the lower part of each solution chamber is a centrally located solution circulator or agitator 115 mounted on the central shaft 116 which is suspended from a suitable bearing 117 at the upper end of the uppermost column 104 which is closed by the cover 118. The shaft 116 is driven by the sheave or pulley 119 so as to circulate the solution in the chamber 101 as indicated by the arrows. Solution from the supply tank 120 is supplied to the uppermost solution chamber 101 through the inlet pipe 121, the supply being regulated by the float valve 122 so as to maintain the level in the upper solution chamber 101 as indicated. Concentrated solution from the lowermost chamber 101 is discharged from the main vertical outlet pipe 123 through the float controlled outlet valve 124 and outlet pipe 125, the height I being so proportioned to the height II that the concentrated solution in column I approximately balances the solution in column II, but with sufficient difference to cause a flow of solution upward through the outflow pipe 123 which is regulated by the valve 124. Superheated steam under the required pressure is supplied to the jacket 102 of the lowermost effect through the steam inlet pipe 111. To start the apparatus, air is completely displaced from the jackets 102 by admitting sufficient live steam through the valves 126 and 127 to displace and drive all the air out of the jackets through the valve 128, and from the main outlet pipe 123 and solution chambers 101 by closing the outlet valve 129 and release valve 130 and inlet valve 122 and outlet valve 135, and admitting sufficient live steam through the valves 131 and 132 to displace all the air through the valve 133. When the air has been completely displaced from the apparatus, the steam inlet valves 126, 131 and 132 and steam outlet valves 128 and 133 are closed and the solution $a_1$ which is preheated and boiled to remove any air by means of the steam coils 134 in the supply tank 120, is then admitted to the apparatus and allowed to gradually fill the chambers from the bottom upward while live steam, under sufficient pressure and superheat to boil the solution at the desired final concentration, is supplied through the steam inlet pipe 111 and valve 127. When the solution has filled the chambers and column as indicated in the drawings, the normal operation of the apparatus is as follows: The agitating device is placed in operation. The steam supplied to the jacket 102 of the lowermost effect D condenses and evaporates the concentrated solution in the solution chamber 101 of the effect D under the pressure of the liquid in the column, and the steam from the solution chamber under this pressure passes through pipes 108 and 111 into the jacket 102 of the effect C, where it condenses and evaporates the less concentrated solution in the solution chamber of this effect, sending the steam from this effect through the pipes 108 and 111 into the jacket of the next effect B, where it condenses and evaporates the less concentrated solution in the solution chamber 101 of this effect, and sends the steam from this chamber through the pipes 108 and 111 into the jacket 102 of the uppermost effect A, where it condenses and evaporates the incoming solution, sending the steam from this solution out through the pipe 108 and valve 129 to the coils 134 of the inlet tank 120 to preheat and boil the solution. The condensate from the jacket 102 of the lowermost effect D accumulates until the float valve 113 opens, allowing the condensate to flow up through the pipes 112 and 114 into the jacket 102 of the effect C, the condensate in this effect being similarly forced upward into B and that in B into A, from which it is finally discharged through the condensate outlet 112 of this uppermost effect. It will be seen that, as the solution is evaporated in passing down the successive stages or effects, the pressure of the steam in the effect increases, the steam of highest pressure being in thermal contact with the most concentrated solution which requires the highest temperature for evaporation. As the concentration of the solution in the evaporating column builds up, a regulated flow of solution is allowed to flow out of the outlet pipe 125 through the valve 135 until the column 123 is entirely filled with concentrated solution, after which, the valve 135 is left open and the discharge of solution is regulated by the float valve 124. As previously noted, the apparatus should be so designed that the solution in column II is very slightly heavier than the concentrated solution of column I so that, as the solution is concentrated in the effects A, B, C, and D, it is forced up the column 123 and out through the valve 124. To secure any desired variation in the concentration of the outflowing solution, several outlet valves and pipes 124, 135, and 125 at different levels may be supplied, the ones not in use being closed by their respective valves 135.

The point to which the evaporation in the preliminary evaporator is carried depends upon the type of evaporator used. If carried out in a multiple effect evaporator, it is not economical to carry the concentration much beyond a 35% $MgCl_2$ solution, but, if carried out in a spray evaporator, the concentration may be carried to 50% $MgCl_2$ or higher.

The partially concentrated solution $b$ from the preliminary evaporator, or the already partially concentrated solution from any other source, is evaporated in the kiln type concentrator 2 until a hot thick syrupy solution that will just flow is secured. This concentrating operation is carried out in a rotary kiln, the solution being passed through the kiln in countercurrent to and in direct contact with hot furnace gases $k$ from a suitable combustion furnace, or waste gases $o$ from the decomposing furnace 6, and hot waste gases $m$ from the pug mill 4. The waste gases $n$ from kiln concentrator carry some HCl and are passed through the spray absorber 3, in countercurrent to a mixture of dilute $MgCl_2$ solution $a_2$ mixed with sufficient finely divided MgO from the decomposing furnace 6 to absorb the HCl and form $MgCl_2$, the solution $a_3$ from the absorber being sent to the preliminary evaporator or to the kiln concentrator 2 if no preliminary evaporator is used.

2. Formation of a solid $MgCl_2$ - $MgO$ product

The thick, syrupy, concentrated, barely fluid solution $c$ from the kiln concentrate is mixed with sufficient finely divided MgO $p$ from the decomposing furnace 6 in the pug mill 4 to form a solid mixed product of $MgCl_2$ - $MgO$. The amount of MgO required in this operation depends upon the concentration of the $MgCl_2$ solution $c$ from the kiln concentrator 2. The pug mill 4 is constructed with a cover so that hot gases $l$ from a suitable furnace, or waste gases from the decomposing furnace, may be passed through the mill in countercurrent to the $MgCl_2$ - $MgO$ to secure a product $d$ which is sufficiently dry so that it may be readily broken up in the disintegrator 5. If the $MgCl_2$ is to be decomposed to form $Cl_2$, this product $d$ must be dried more thoroughly than if $MgCl_2$ is to be decomposed to form HCl since, any water in the mixture going to the decomposing furnace 6 will form HCl.

3. Decomposition of the $MgCl_2$

The dried $MgCl_2$ - $MgO$ product $d$ from the pug mill 4 is broken down to approximately a 6 or 8 mesh product in the disintegrator 5. At this size a substantially complete decomposition of the $MgCl_2$ in the product may be secured in a relatively short time of treatment. If ground much finer the charge is less porous and not as permeable to the decomposing gases as the coarser product, and if too coarse, requires a longer time for complete decomposition of the $MgCl_2$.

The crushed $MgCl_2$ - $MgO$ product $e$ is heated to 600° C.–650° C. or higher, if desired, in the decomposing furnace and treated with superheated steam $g$ to form MgO and HCl, or with preheated air or oxygen $g$ to form MgO and $Cl_2$. To secure rapid and complete decomposition of the $MgCl_2$ with a minimum amount of steam or air, the decomposition must be carried out in a muffle type furnace, and the $MgCl_2$ - $MgO$ product must be passed through the furnace in countercurrent to the steam or air and further, the $MgCl_2$ - $MgO$ product must be brought into intimate mixture and contact with the steam or air. Also, for maximum efficiency, the movement of the $MgCl_2$ - $MgO$ product must be sufficiently upward and the movement of the gases sufficiently downward, to avoid mixture of the HCl with the steam, or $Cl_2$ with the air, which occurs if the movement of the $MgCl_2$ - $MgO$ mixture is downward through the furnace and the movement of steam or air is upward. Since the HCl is twice as heavy as the steam, and the $Cl_2$ is considerably over twice as heavy as the oxygen or air, if the decomposing gases are compelled to move upward the tendency of the heavier gases (HCl or $Cl_2$) is to move downward mixing with the incoming steam or air; whereas, if the decomposing gases (steam or air) move downward, this mixture is avoided as the heavier acid gases tend to move ahead of the lighter decomposing gases, thus preventing their mixture and increasing the efficiency of the steam or air in the decomposition of the $MgCl_2$ and reducing the required excess of steam or oxygen to a minimum. The effect is important in the decomposition with steam but, is especially noticeable and important in the decomposition with air (oxygen).

To secure these important factors in the decomposition of the $MgCl_2$, a furnace of the type shown in Fig. III is preferred, though the decomposition may be carried out in other types of furnaces as later mentioned. The furnace of Fig. III consists of a rectangular sloping decomposition chamber or muffle 201, the bottom 202 of which consists of the upper wall of the lower heating space 203, and the top 204 of which consists of the lower wall 204 of the upper heating space 205. The muffle or heat transfer walls 202 and 204 consist of any suitable refractory material such as fire brick, Alundum, or Carbofrax. The side walls of the decomposition chamber (not shown) are not heated but are solid exterior walls, through which the rabble shafts enter through suitable glands to prevent escape of gases from the furnace. The $MgCl_2$ - $MgO$ product $d_2$ is fed into the lower end of the decomposition chamber 201 of the furnace from the feed hopper 206 by means of the plunger feeder 207, and the decomposing charge is moved through the furnace to the upper end of the decomposition chamber by the horizontal rabbles 208; the MgO $b_2$ is discharged from the discharge hopper 209 by means of the rotary water cooled discharge feeder 210. Both the feed hopper 206 and discharge hopper 209 are at all times kept partly filled with the $MgCl_2$ - $MgO$ and the MgO, so as to prevent escape of gases from the decomposition chamber 201. Steam or air (oxygen) $c_2$ for the decomposition of the $MgCl_2$ is admitted to the decomposition chamber 201 through the perforated pipe 211 which extends across the upper end of the decomposition chamber 201 and out through the side wall of the chamber. The HCl, or $Cl_2$, are withdrawn from the decomposing chamber 201 through the perforated pipe 212, which extends across the lower end of the chamber 201, and out through the side wall of the chamber to the connection to the condenser, or furnace, or spray leacher in which the HCl or $Cl_2$ is to be utilized. Hot furnace gases are admitted to the heating spaces 203 and 205 through the lateral inlet openings 213 and 214 in the upper ends of the heating spaces 205 and 203, and the waste gases are discharged from these heating spaces through the lateral outlet openings 215 and 216. (If desired, a number of lateral inlet openings such as 213 and 214 may be spaced longitudinally along the sides of the heating spaces 203 and 205 to admit hot furnace gases, so as to maintain a more uniform temperature in the decomposition space 201, or the hot furnace gases may be admitted through the openings 215 and 216 and discharged through the openings 213 and 214, so as to secure a concurrent flow of charge and heating gases.) The charge of $MgCl_2$ - MgO product is passed upward through the sloping decomposition chamber 201, in countercurrent to the decomposition gases (steam or air) (or oxygen), by the horizontal rabbles 208 shown in enlarged cross section in Fig. IV. The rabbles 208 consist of a suitable refractory material (such as Carbofrax, Alundum, etc.), or suitable alloy not affected by HCl gas, or substantially the cross section shown in the figure. The rabbles are rigidly mounted on the hollow shaft 301 and held in position on the shaft 301 by the keys 302. The rabbles are arranged in two alternate series $A_3$ and $B_3$, the rabbles $A_3$ being stationary while the rabbles $B_3$ move and the rabbles $B_3$ being stationary while the rabbles $A_3$ move. The action of the rabbles is as follows: The rabbles $B_3$ having completed a half revolution in the direction indicated by the arrow $c_3$ and having lifted and dropped a load of material $g_3$ in front of the lower arm of the rabble as indicated by the arrow $e_3$, comes to rest in a fixed inclined position $X_3$—$X_3$ as shown. The rabbles $A_3$ then move through a half revolution in the direction indicated by the arrow $d_3$, scooping up the material $g_3$ and lifting it and allowing it to run down in front of the rabble $A_3$, as indicated by the arrow $f_3$ and rabble in dotted outline, to be picked up by the next rabbles $B_3$ in the same manner and so on longitudinally through the decomposition chamber, being thoroughly mixed and brought into intimate contact with the decomposing gases in each lifting and running operation. The rate of movement of the charge through the furnace is regulated by the movement of the rabbles and must be so proportioned to the length of the decomposition chamber, as to allow sufficient time of treatment to secure the required degree of decomposition. By this countercurrent movement of the charge up the sloping chamber and of the downward flow of gases in contact with the thoroughly mixed charge, a rapid and complete decomposition of the $MgCl_2$ with a minimum of steam or air (oxygen) is secured.

If desired a straight line furnace of the type described but without the upper heating chamber 205 and with rabbles supported on shafts extending through the roof of the chamber 201 (such as is in use for roasting ores) may be used for the decomposition, and may secure good results if made on a slope as described, but will require a longer time of treatment than with the furnace described, due to the much less effective mixing and contact with the decomposing gases secured by these commonly used rabbles and method of rabbling. If an excess of decomposing gas is not deleterious in the uses to which the HCl or $Cl_2$ is to be put, the decomposition may be carried out in a multiple hearth furnace of the type used in the manufacture of HCl from salt and $H_2SO_4$, but a much larger furnace and longer time of treatment and greater excess of decomposing gas (steam or air) will be required with such a type of furnace and method of carrying out the decomposing operation.

The steam $g$, or air, may be superheated by the hot waste gases $o$ from the decomposing furnace 6. Waste gases $o$ from the decomposing furnace 6 may also be used, as indicated at $k$, for evaporation of the water in the $MgCl_2$ solution in the kiln concentrator 2 and for drying, as indicated at $l$, the $MgCl_2$ - MgO in the pug mill, thus reducing the amount of fuel required in the process. The HCl gas or $Cl_2$ $h$ from the decomposing furnace 6 may be used directly as such in leaching or precipitation processes without further treatment or, the HCl may be condensed to form an HCl solution $j$ in the condenser 7 or the $Cl_2$ may be dried in the condenser 7 to remove moisture and secure dry $Cl_2$ $j$, previous to its use in chloridizing ores or for other uses.

What is claimed is:

1. The process of forming a solid $MgCl_2$ - MgO product from a $MgCl_2$ solution and of decomposing the $MgCl_2$ in said product, which consists in heating and evaporating said solution to form a hot very concentrated barely fluid solution, mixing said last solution with sufficient finely divided MgO to form a solid $MgCl_2$ - MgO product, crushing said product to a relatively fine condition and passing said product upward through a sloping longitudinal externally heated chamber in countercurrent to an oxidizing gas passed downward through said chamber, thereby decomposing the $MgCl_2$ in said product and forming MgO and HCl, and using part of said MgO to form more $MgCl_2$ - MgO product for decomposition as described.

2. The process of treating $MgCl_2$ to form MgO and HCl, which consists in passing a relatively finely crushed product containing $MgCl_2$ upward through a sloping longitudinal heated chamber in countercurrent to an oxidizing gas passed downward through said chamber.

3. The process of forming a solid $MgCl_2$ - MgO product from a $MgCl_2$ solution and of decomposing the $MgCl_2$ in said product, which consists in heating and evaporating said solution to form a hot very concentrated barely fluid solution, mixing said last solution with sufficient finely divided MgO to form a solid $MgCl_2$ - MgO product, crushing said product to a relatively fine condition and passing said product upward through a sloping longitudinal externally heated chamber in countercurrent to steam passed downward through said chamber, thereby decomposing the $MgCl_2$ in said product and forming MgO and HCl, and using part of said MgO to form more $MgCl_2$ - MgO product for decomposition as described.

4. The process of forming a solid $MgCl_2$ - MgO product from a $MgCl_2$ solution and of decomposing the $MgCl_2$ in said product, which consists in heating and evaporating said solution to form a hot very concentrated barely fluid solution, mixing said last solution with sufficient finely divided MgO to form a solid $MgCl_2$ - MgO product, passing hot gases over the mixture during said mixing operation to dry the $MgCl_2$ product, crushing said last product to a relatively fine condition, passing said product upward through a sloping longitudinal and externally heated chamber in countercurrent to gas containing free oxygen passed downward through said chamber, thereby decomposing the $MgCl_2$ in said product and forming MgO and chlorine, and using part of said MgO product to form more $MgCl_2$ - MgO product as described.

5. The process of treating $MgCl_2$ to form MgO and HCl, which consists in passing a relatively finely crushed product containing $MgCl_2$ upward through a sloping longitudinal heated chamber in countercurrent to steam passed downward through said chamber.

6. A process according to claim 5, in which the chamber is externally heated.

7. The process of treating $MgCl_2$ to form MgO and $Cl_2$, which consists in passing a relatively finely crushed product containing $MgCl_2$ upward through a sloping longitudinal heated chamber in countercurrent to gas containing free oxygen passed downward through said chamber.

8. A process according to claim 7, in which the chamber is externally heated.

9. A process according to claim 1, in which the evaporation takes place in a plurality of stages.

10. A process according to claim 1, in which the evaporation takes place in a plurality of stages, one of said stages comprising multiple effect evaporation.

NIELS C. CHRISTENSEN.